(12) United States Patent
Fotta

(10) Patent No.: US 8,311,204 B2
(45) Date of Patent: Nov. 13, 2012

(54) AUTOMATIC COMPLAINT REGISTRATION FOR VIOLATIONS OF TELEPHONIC COMMUNICATION REGULATIONS WITH CALL REJECTION

(75) Inventor: Keith A. Fotta, Duxbury, MA (US)

(73) Assignee: First Orion Corp., Conway, AR (US)

( * ) Notice: Subject to any disclaimer, the term of this patent is extended or adjusted under 35 U.S.C. 154(b) by 1434 days.

(21) Appl. No.: 11/870,080

(22) Filed: Oct. 10, 2007

(65) Prior Publication Data
US 2009/0097630 A1  Apr. 16, 2009

(51) Int. Cl.
*H04M 1/66* (2006.01)
*H04M 3/42* (2006.01)

(52) U.S. Cl. .............. 379/210.02; 340/500; 356/369; 379/88.21; 379/114.01; 379/196; 379/212.01; 379/265.09; 455/423; 463/42; 704/270.1; 705/346

(58) Field of Classification Search ............ 379/210.02, 379/67.1, 88.21, 88.26, 93.23, 114.01, 114.22, 379/196, 201.01, 207.02, 212.01, 265.09; 340/500; 356/369; 455/423; 463/42; 600/300; 704/270.1; 705/346
See application file for complete search history.

(56) References Cited

U.S. PATENT DOCUMENTS

| | | | | |
|---|---|---|---|---|
| 5,327,486 A | * | 7/1994 | Wolff et al. | 379/93.23 |
| 5,467,388 A | * | 11/1995 | Redd et al. | 379/210.02 |
| 5,471,519 A | * | 11/1995 | Howe et al. | 379/88.26 |
| 5,555,299 A | * | 9/1996 | Maloney et al. | 379/212.01 |
| 5,579,379 A | * | 11/1996 | D'Amico et al. | 379/114.01 |
| 5,651,053 A | * | 7/1997 | Mitchell | 379/210.02 |
| 5,652,789 A | * | 7/1997 | Miner et al. | 379/201.01 |
| 5,946,386 A | * | 8/1999 | Rogers et al. | 379/265.09 |
| 6,353,663 B1 | * | 3/2002 | Stevens et al. | 379/114.22 |

(Continued)

FOREIGN PATENT DOCUMENTS
EP  1 691 538 A  8/2006

OTHER PUBLICATIONS

Srivastava, K., et al., "Preventing Spam for SIP-based Instant Messages and Sessions," [online] Oct. 28, 2004, Retrieved from the internet URL: http://www.cs.columbia.edu/techreports/cucs-042-04.pdf retrieved on May 5, 2006.

(Continued)

*Primary Examiner* — Gerald Gauthier
(74) *Attorney, Agent, or Firm* — Gottlieb, Rackman & Reisman, P.C.

(57) ABSTRACT

In an embodiment, call information is received indicating that a called party, responsive to receiving a call from a calling party, desires to record a complaint against the calling party relating to receipt of the call. A call complaint based on the call information is added to a complaint database. Call rejection information based on the call information is forwarded to a call rejection database configured to indicate blocking of further calls from the calling party to the called party. The complaint information may be forwarded to the complaint database through a number of different communications paths. In another embodiment, a request for a change in status of an identifier entry on a user call rejection list is received. The status of the identifier entry on the user call rejection list is changed based on a comparison of the current status of the identifier entry with the request. The identifier entry and corresponding status are sent to a gateway for call rejection treatment based on the identifier entry and status.

21 Claims, 17 Drawing Sheets

U.S. PATENT DOCUMENTS

| | | |
|---|---|---|
| 6,453,019 B1 | 9/2002 | Latter et al. |
| 6,549,619 B1 * | 4/2003 | Bell et al. ................ 379/210.02 |
| 6,765,994 B2 | 7/2004 | Latter et al. |
| 6,771,950 B1 | 8/2004 | Shupe et al. |
| 6,782,268 B1 | 8/2004 | Thompson et al. |
| 6,784,992 B1 * | 8/2004 | Kye et al. ...................... 356/369 |
| 6,853,717 B1 | 2/2005 | Frentz et al. |
| 6,959,076 B2 * | 10/2005 | Chang et al. ............. 379/207.02 |
| 6,990,187 B2 | 1/2006 | MacNamara et al. |
| 7,016,843 B2 * | 3/2006 | Fitzpatrick et al. ......... 704/270.1 |
| 7,068,761 B2 * | 6/2006 | Latter et al. .................. 379/67.1 |
| 7,283,969 B1 * | 10/2007 | Marsico et al. ............... 705/346 |
| 7,359,499 B1 * | 4/2008 | Frentz et al. ............. 379/210.02 |
| 7,382,242 B2 * | 6/2008 | Martin .......................... 340/500 |
| 7,552,058 B1 | 6/2009 | Zhang |
| 7,613,286 B2 * | 11/2009 | Hong ....................... 379/210.02 |
| 7,805,136 B1 * | 9/2010 | Everson et al. ............... 455/423 |
| 8,005,195 B2 * | 8/2011 | Luneau et al. ............. 379/88.21 |
| 8,005,200 B2 * | 8/2011 | Fotta et al. .................... 379/196 |
| 2002/0085700 A1 | 7/2002 | Metcalf |
| 2003/0195394 A1 * | 10/2003 | Saalsaa ........................ 600/300 |
| 2004/0114747 A1 | 6/2004 | Trandal et al. |
| 2004/0218743 A1 | 11/2004 | Hussain et al. |
| 2005/0201362 A1 | 9/2005 | Klein et al. |
| 2006/0182029 A1 | 8/2006 | Kealy et al. |
| 2008/0070689 A1 * | 3/2008 | Van Luchene et al. ......... 463/42 |
| 2008/0207327 A1 * | 8/2008 | Van Luchene et al. ......... 463/42 |
| 2009/0097630 A1 * | 4/2009 | Fotta ....................... 379/210.02 |

OTHER PUBLICATIONS

Dantu, et al., "Detecting Spam in VoIP Networks," SRUTI: Steps to Reducing Unwanted Traffic on the Internet Workshop, XP002405070, pp: 31-37 (2005).

C. Brent Hirschman, Grant E. Swinehart & Marie L. Todd, Lass: Putting the Telephone Customer in Charge, Record, May 1985, pp. 10-16.

* cited by examiner

| CALLING PARTY DN 302 | CALLED PARTY DN 304 | DATE OF CALL 306 | TIME OF CALL 308 | REVERSE LOOKUP CALLING PARTY 310 | REVERSE LOOKUP CALLED PARTY 312 | CALLED PARTY NOTES 314 | REGULATORY DB VIOLATED 316 | OTHER 318 |
|---|---|---|---|---|---|---|---|---|

| CALLED PARTY DN 352 | CALLING PARTY DN 354 | DATE OF REQUEST 356 | TIME OF REQUEST 358 | STATUS 360 | SOURCE ID 362 | OTHER 364 |
|---|---|---|---|---|---|---|

AUTOMATIC COMPLAINT REGISTRATION FOR VIOLATIONS OF TELEPHONIC COMMUNICATION REGULATIONS WITH CALL REJECTION

BACKGROUND

Complaints regarding unsolicited and unwanted telephonic communications such as telemarketing phone calls, faxes and pre-recorded messages have led to significant new federal and state laws and regulations to protect consumers and businesses from these abusive marketing practices. Similar laws and regulations exist or have been proposed in other countries, including Canada, Australia and every country in the European Union.

Certain regulations, such as the United States Federal Trade Commission's (FTC) Telemarketing Sales Rules, require that a business maintain a list of telephone numbers for consumers who express a desire not to be solicited by telephone, known as a "Do-Not-Call" (DNC) list, and take appropriate measures to ensure that outgoing calls to telephone numbers on DNC lists are blocked. The DNC lists may include one or more lists specific to a particular business, as well as state-wide, national and industry-imposed lists such as the Direct Marketing Association Telephone Preference Service list. Other DNC regulations may define how, when, to whom and under what conditions consumers and businesses may be contacted. A single violation of a federal or state DNC regulation can result in a substantial fine.

Despite the existence of such laws and regulations, many violations occur and go unreported on a daily basis due to the often complicated effort required to file a complaint with the appropriate regulatory authority. In most cases the complaining party must file the complaint through a website by identifying the offending party, the complaining party, and the date and time of the violation. In practice, the process of having to know where to file the complaint, efficiently collecting the required information and taking the time to actually file the complaint, eliminates all but a very small percentage of viable and enforceable complaints. For example, the Federal Trade Commission typically waits for fifty complaints to accumulate before initiating an investigation. Based upon an estimate that less than 0.2% of all violations are ever reported, over 25,000 violations will have occurred before an investigation is ever initiated.

SUMMARY

In an embodiment, a method comprises receiving call information to record a complaint from a called party against a calling party relating to receipt of a call, adding the call information to a complaint database and forwarding the call information to a call rejection database configured to indicate blocking of further calls from the calling party to the called party. Among other things, the complaint information may include the directory numbers of both the called party and the calling party.

In an embodiment, citations can be sent to the calling party based upon the number of received complaints exceeding a threshold. An advantage of this approach is that the citations may help to achieve greater compliance by calling parties with rules and regulations for unsolicited telephonic communications. By notifying the calling parties of the complaints regarding such violations, the calling parties may be able to more quickly identify and correct those issues that served to generate the complaints.

In another embodiment, a method includes receiving a request for a change in status of an identifier entry, such as a directory number, on a user call rejection list. The status of the identifier entry may be changed on the user call rejection list based on a comparison of the current status of the identifier entry with the request. The change may be to add or remove a particular directory number to or from a user's call rejection list. The identifier entry and corresponding status may be sent to a gateway. The user call rejection list may be a list of directory numbers from which a consumer wishes to block incoming communications. In some embodiments, the change in status may be prompted by a user from a telephone, cellular phone, voice over internet protocol (VoIP) terminal or web interface.

BRIEF DESCRIPTION OF THE DRAWINGS

The foregoing and other features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIG. 3A illustrates an example record of a DNC complaint database that stores and manages DNC complaint data.

FIG. 3B illustrates and example call rejection record.

DETAILED DESCRIPTION

Figure 1A:
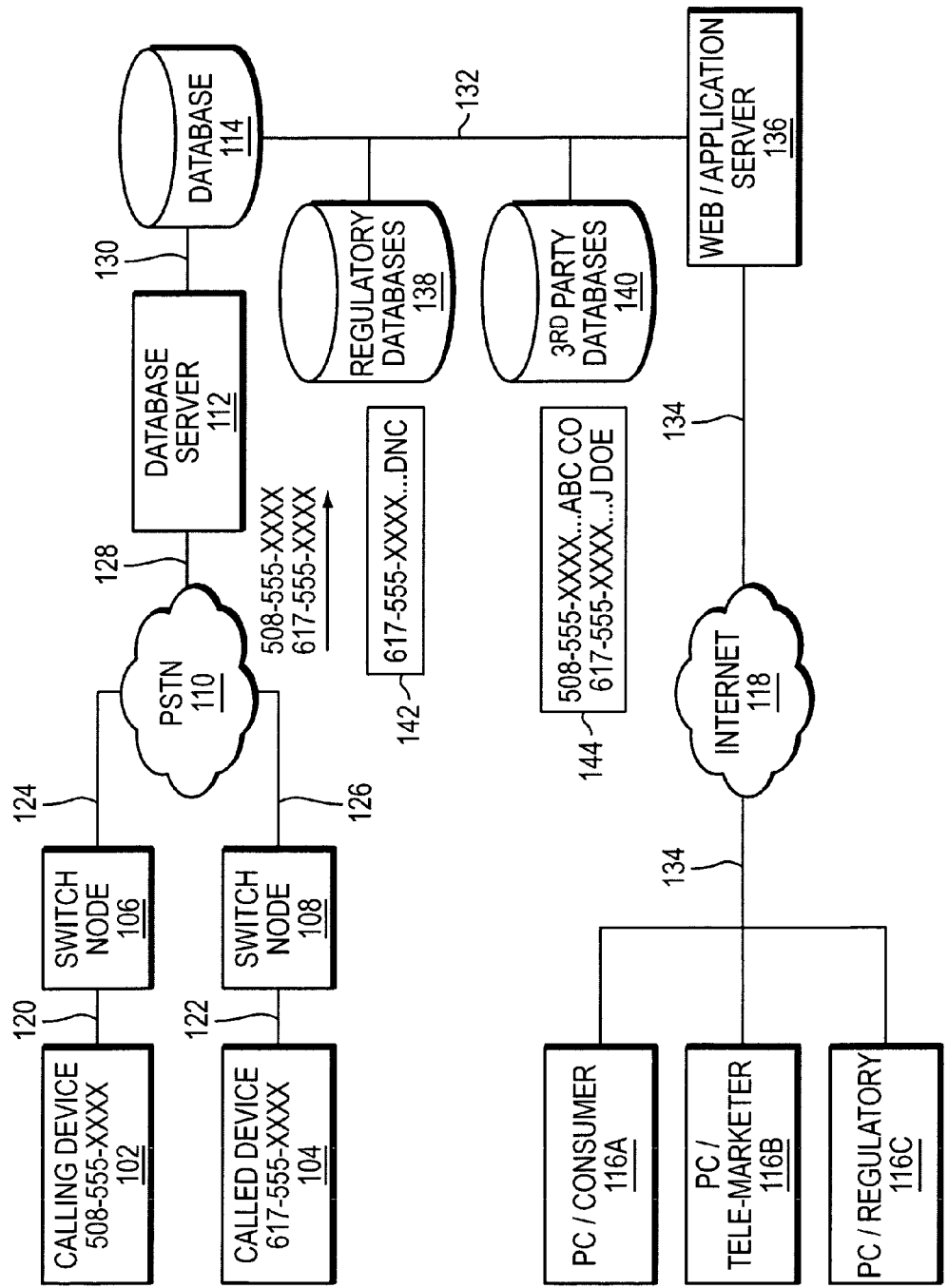
FIGS. 1A-1E illustrate embodiments of a communication system.

FIGS. 1A-1E illustrate example communication systems that illustrates principles of the present approach. Calling device 102 and called device 104 connect to telecommunication network 110 through respective switch nodes 106, 108. In the example shown in FIG. 1A, the network 110 is the public switched telephone network (PSTN) and may be understood to include the switch nodes 106, 108. It is also understood that the present approach may be applied to any network capable of providing a communication connection between an origin and destination. In other embodiments, the network 110 may comprise wireless, wireline, private or public network elements a virtual private network within the Internet, a wide area network, local area network, Voice over Internet Protocol network, or the like, or any combination thereof. The network 110 may be implemented using any appropriate transmission, switching and routing technologies, including but not limited to Internet Protocol (IP), Asynchronous Transfer Mode (ATM) and Signaling System 7 (SS7).

The communication system further includes database server 112, complaint database 114, web/application server 136, regulatory databases 138, third party databases 140, personal computers 116 and Internet 118.

Calling device 102 and called device 104 are communication devices such as wireline telephones, wireless telephones, facsimile machines and answering machines. For purposes of example, the device 102 is referred to as "calling device," indicating that it is the device that originates a telemarketing call. Likewise, device 104 is referred to as "called device," indicating that it is the device that receives the telemarketing call.

Calling device 102 and called device 104 connect via links 120, 122 to the switch nodes 106, 108, respectively. The switch nodes may be private branch exchanges or local processing switches often referred to as central office switches. The switch nodes 106, 108 are connected via links 124, 126, respectively, to PSTN 110. A central office switch may comprise any class 5 switch, for example, which includes memory and processor elements for storing and executing software routines for call processing, including providing access to the network 110 and various call features. In an embodiment, the central office switch includes a dual-tone multi-frequency (DTMF) receiver for receiving and processing DTMF signals sent from devices 102, 104.

Figure 1B:
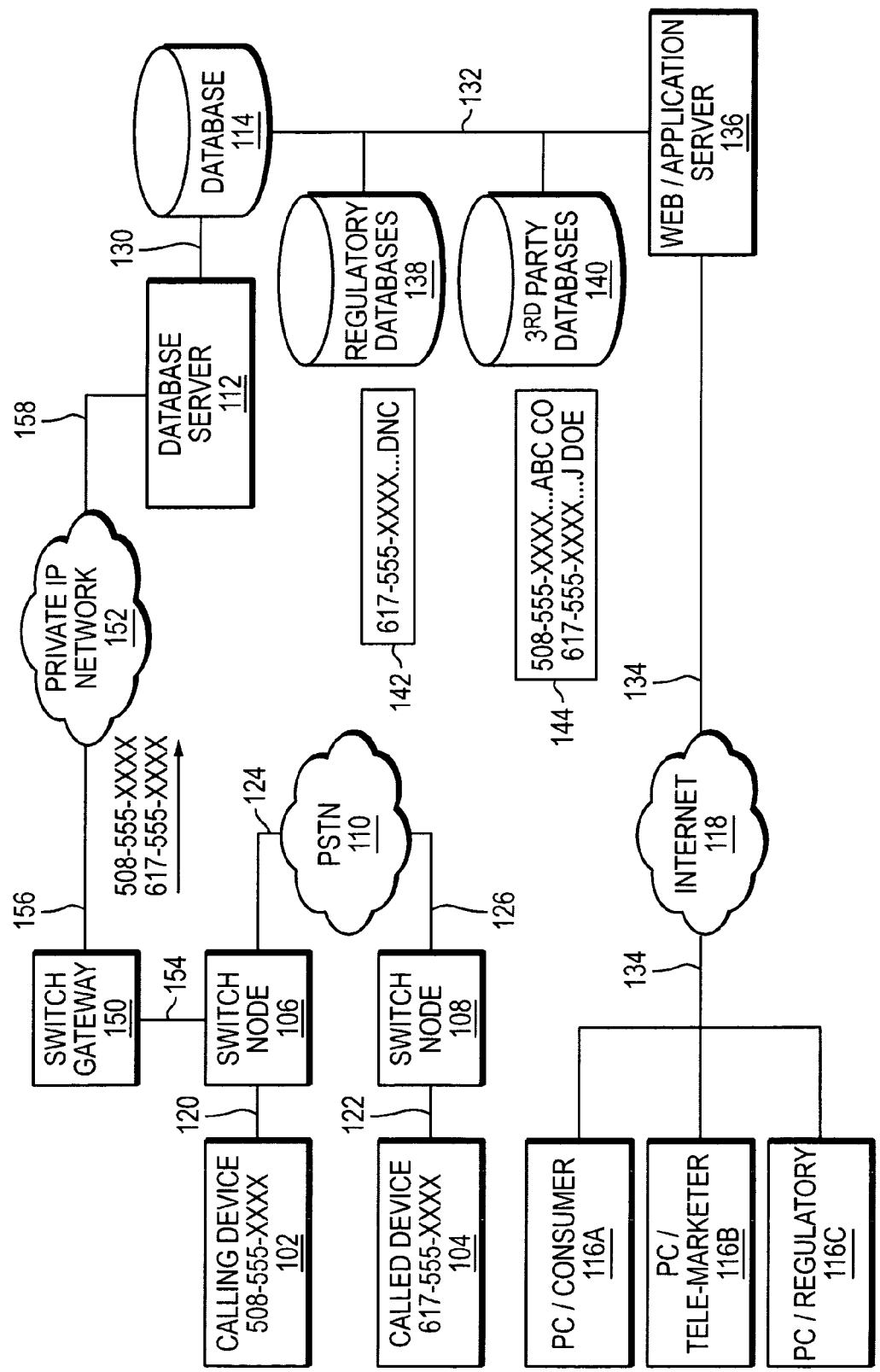
Figure 1C:
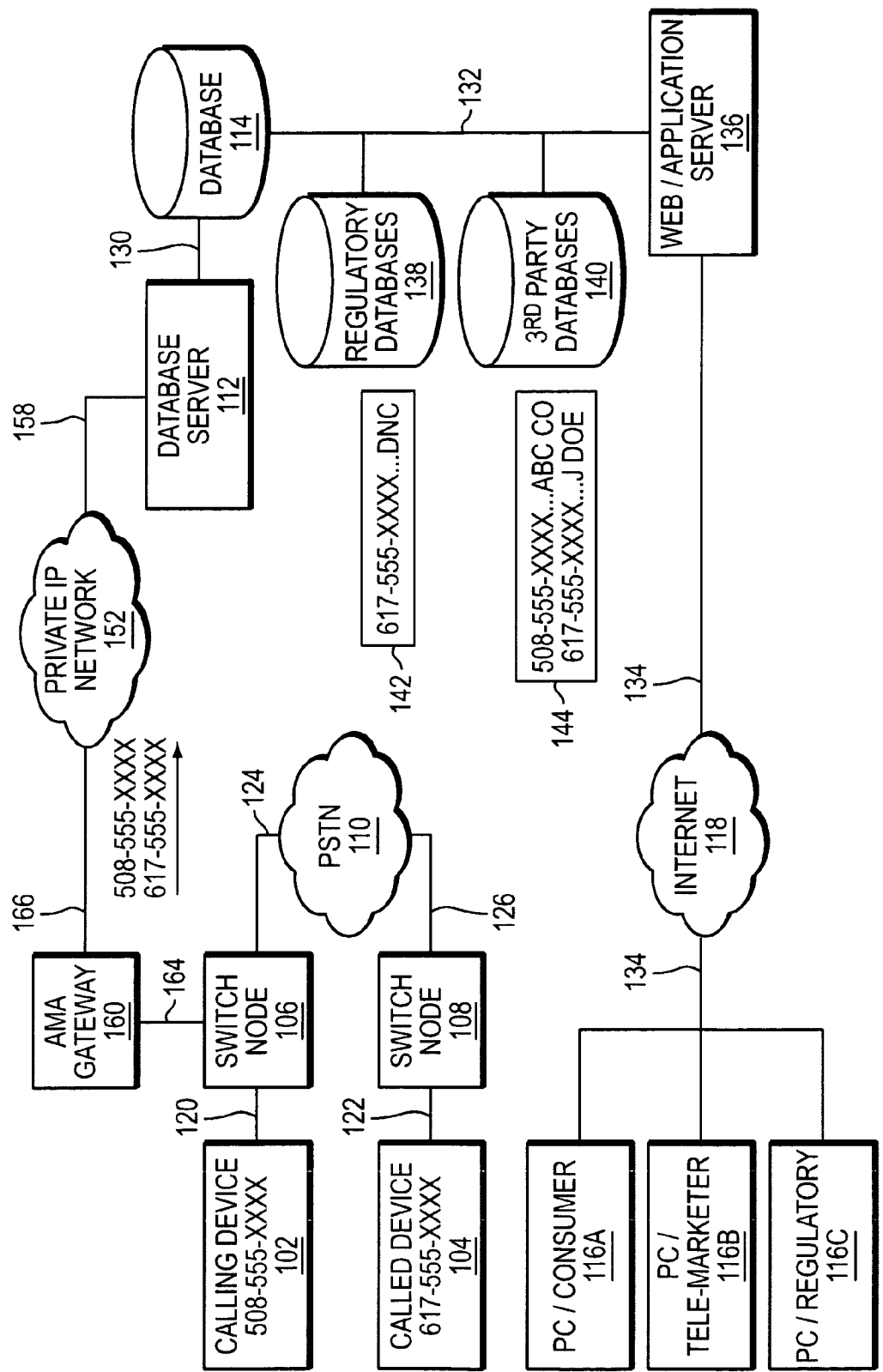
Figure 1D:
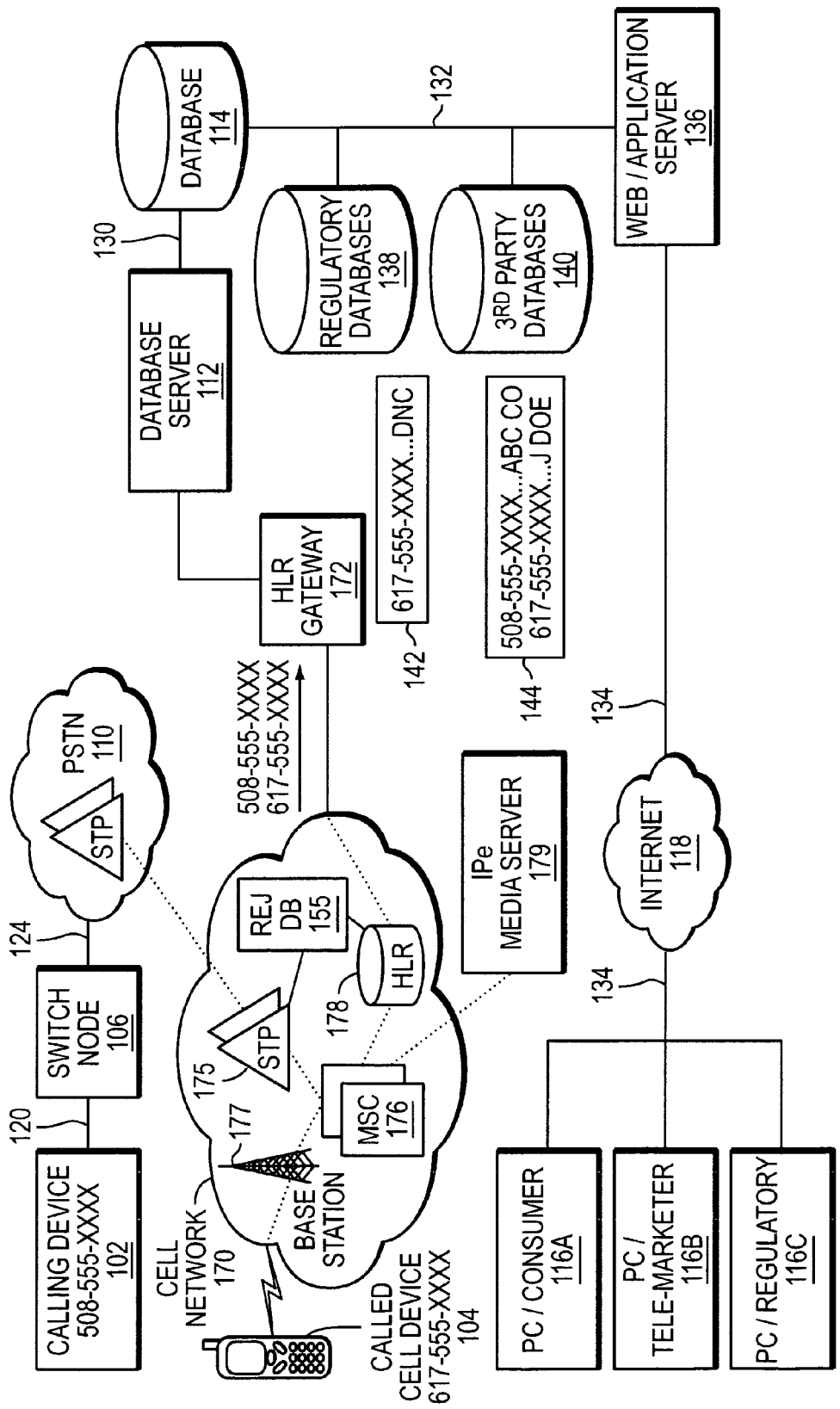
Figure 1E:
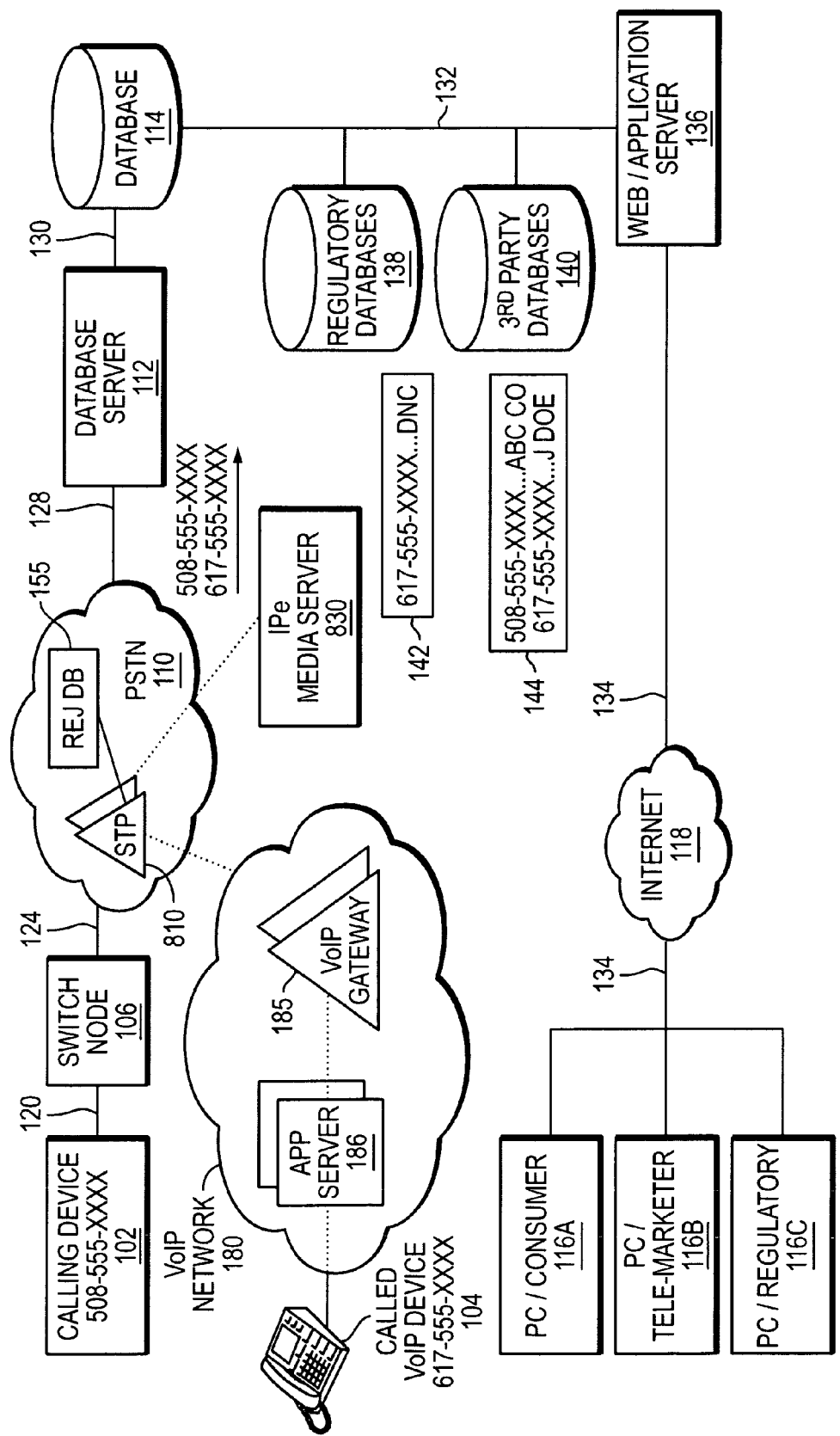

In the example communication systems shown in FIGS. 1A-1C, the switch nodes 106, 108 are shown as single entities. However, it is understood that such switch nodes may include multiple physical switches. For example as shown in FIGS. 1D-1E, communication devices, such as called device 104a and 104b, may be connected to the PSTN 110 through intermediate networks 170 and 180, respectively. It is also understood that, depending on the relative locations of the calling party and the called party, the switch nodes 106, 108 may be one and the same switch node.

Referring back to FIG. 1A, the links 124, 126 may be one or more links that transport payload information and signaling information on the same link or on separate links. The payload information may include voice information and additional information such as video, data, commands and text. Data links 128 connect network 110 to database server 112.

Figure 8:
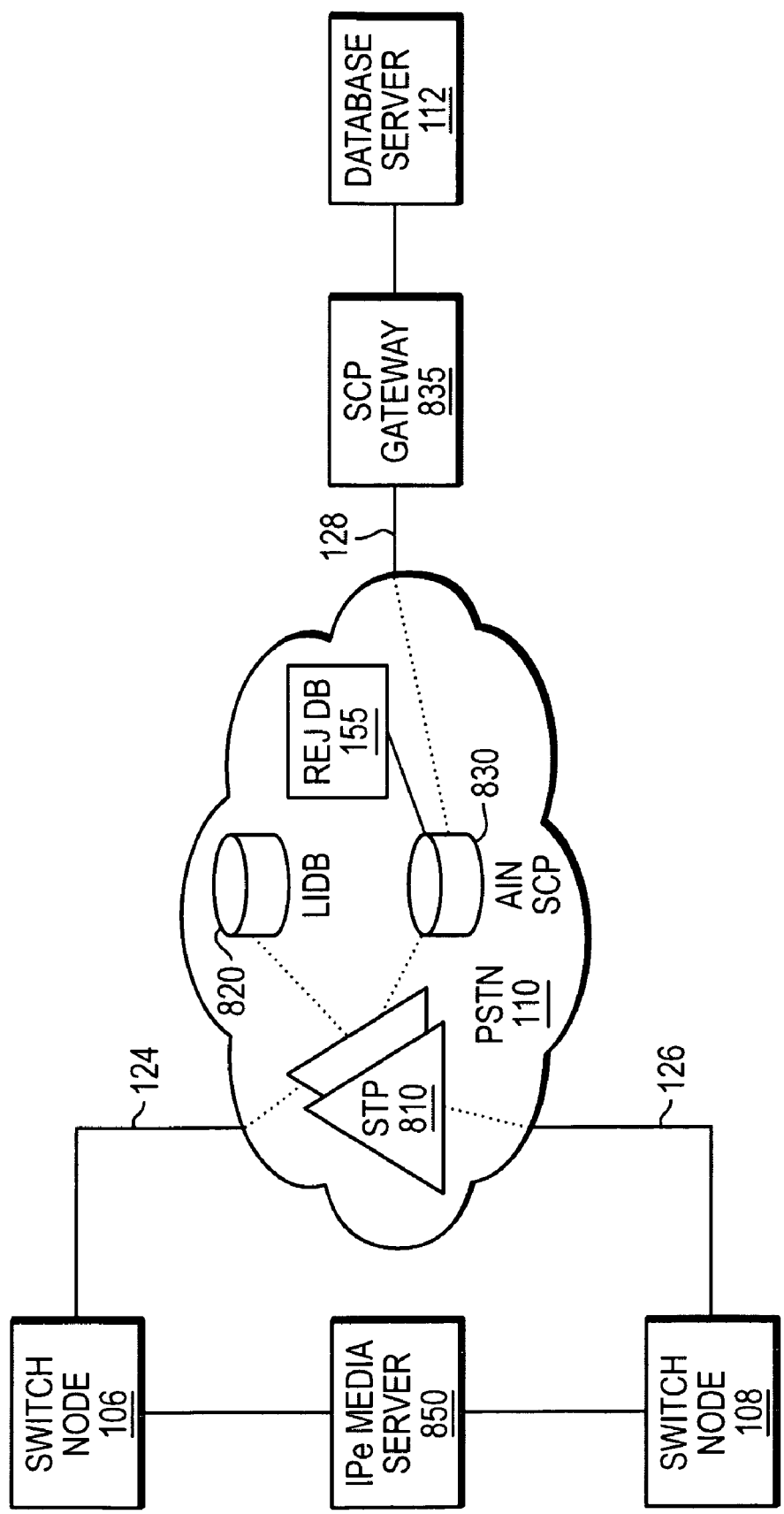
FIG. 8 illustrates an example configuration of the PSTN network of FIG. 1A.

FIG. 8 illustrates an example configuration of a portion of the PSTN 110 of FIG. 1A. The PSTN 110 includes a switch transfer point (STP) 810 operable to receive and transfer signals from switch nodes 106, 108. The STP 810 also provides communication to a service control point (SCP) 830 and a line information database (LIDB) 820. An SCP is a standard component of an intelligent network telephone system which is used to control service, and connects to a database server 112 through a gateway 835. SCP may be deployed using SS7, Sigtran or Session Initiation Protocol (SIP) IP technologies. The SCP may query a database, such as the LIDB 820, to identify the number to which the calls are routed. As described further herein, the SCP may also query a call rejection database 155 for call rejection treatment. The SCP may also communicate through switch nodes with an IPe Media Server 850 which may accept and process information from the user, such as account codes, using a DTMF receiver and implementing feature codes or vertical service codes (VSCs) that are provided by local exchange carriers.

FIGS. 1B-1E illustrates various network configurations according to other embodiments of the invention that provide communications to a database server 112.

In an embodiment shown with respect to FIG. 1B, a data link 154 connects switch node 106 to a switch gateway 150. The data link 154 interface between switch node 106 and switch gateway 150 may be a generic data interface provided on class 5 switches. The switch gateway 150 may send call information through a datalink 156 to a private network 152 connected to a database server 112 through data link 158.

In another embodiment shown with respect to FIG. 1C, a data link 164 connects switch node 106 to an Automatic Message Accounting (AMA) gateway 160. The AMA gateway 160 may send call information through a datalink 166 to a private network 152 connected to a database server 112 through data link 158. The AMA gateway 160 is a particular type of switch gateway 150 in that it is typically configured to provide detailed billing information directly from the switch nodes 106 in various formats. Further distinction for processing details, are discussed below with respect to FIGS. 2B and 2C.

In the embodiment shown with respect to FIG. 1D, the PSTN 110 communicates with a cellular network 170 to a called device 104a through a series of switches. A switch transfer point (STP) 175 in the cellular network 170 is in communication with called device 104a through a mobile switching center (MSC) 176 and base station transceiver 177. The STP may query call rejection database 155 for call rejection treatment as described further herein.

The MSC 176 provides circuit-switched calling, mobility management, and services to the mobile phones roaming within the area that it serves. The MSC 176 may also feature an IPe Media Server 179 that provides services to subscribers. The MSC communicates with a home location registry (HLR) 178 which contains service profiles and checks the identity of local subscribers. In a cellular network, an HLR stores details of every Subscriber Identity Module (SIM) card issued by the mobile phone carrier. Each SIM has a unique identifier called an International Mobile Subscriber Identity (IMSI) which forms part of each HLR record. The HLR 178 connects to the database server 112 through an HLR Gateway 172.

In the embodiment shown with respect to FIG. 1E, the PSTN 110 communicates with a voice over internet protocol (VoIP) network 180 to a called device 104b through a series of switches. A VoIP gateway 185 communicates through an application server to provide VoIP access to the called device 104b. Here, access to a IPe Media Server 830 may be provided in the PSTN 110 through an STP 810. As described further herein, the STP may query call rejection database 155 for call rejection treatment. Data links 128 connect network 110 to database server 112.

The database server 112 connects to a complaint database 114 over data links 130. As described further herein with respect to FIGS. 2A-2C and FIGS. 3-6, the database server 112 and web/application server 136 manage storage and retrieval of information relating to complaints concerning violations of telephonic communication regulations, such as violation of do-not-call regulations.

In some embodiments, data links 132 connect the complaint database 114, regulatory databases 138 and third party databases 140 to web/application server 136. As described with respect to FIG. 6A, the web/application server 136 manages access to the complaint database 114 by entities such as telemarketing companies, consumers, consumer advocacy groups and regulatory bodies. Such entities may access the database 114 over a global data network (e.g., Internet 118) using PCs 116A, 116B, 116C configured with appropriate browser (e.g., secure web portal) or other application software.

A secure web portal provides regulatory bodies, businesses and consumers with access to review any complaint logs associated with their marketing and other telephonic activity or individual complaints. Access to the information may be provided after a registration process (e.g., as described with the example flow of FIG. 6A below) to ensure that access is limited to appropriate information and that security is maintained to avoid any unauthorized access. This capability can provide tremendous value to regulatory bodies, consumers and businesses alike in that it can provide them access to the most current information about a complaint on demand. Businesses receive the benefit of a tremendous self regulation tool to assist them in managing their risk and identifying weaknesses in their systems and processes throughout their entire organization. Consumers benefit by having the ability to track and access their filed complaints to provide additional information to regulatory bodies in support of any potential violations. Regulatory bodies may also benefit with access to the complaint information to monitor compliance by companies to various telephonic communications regulations. In addition, call statistics, e-mail notifications, alerts, citations and thresholds may be generated for repeat telemarketers or called directory numbers.

The regulatory databases 138 may include prohibited directory numbers derived from any one or a combination of a Federal do-not-call list, a state do-not-call list, an industry-specific do-not-call list, a client internal list and other defined lists. These lists may be periodically synchronized with other lists that are remotely located at another facility such as a local administration facility, local exchange carrier, central administration facility, or another facility. The regulatory databases 138 may be associated with an automated call compliance management system, such as the Call Advisor product available from Gryphon Networks Corp., Norwood, Mass.

The third party databases 140 may be any commercially available or custom database or database service that includes reverse-number lookup data, such as business or personal name and address information.

As will be appreciated, the servers 112, 136 and databases 114, 138, 140 may reside on the premises of a client, a local exchange carrier, local administration facility, central administration facility, or other remote facility. The servers 112, 136 and databases 114, 138, 140 may also be duplicated to reside in any or all of the referenced locations at the same time for different telecommunications carrier implementations and process load balancing.

Figure 2A:
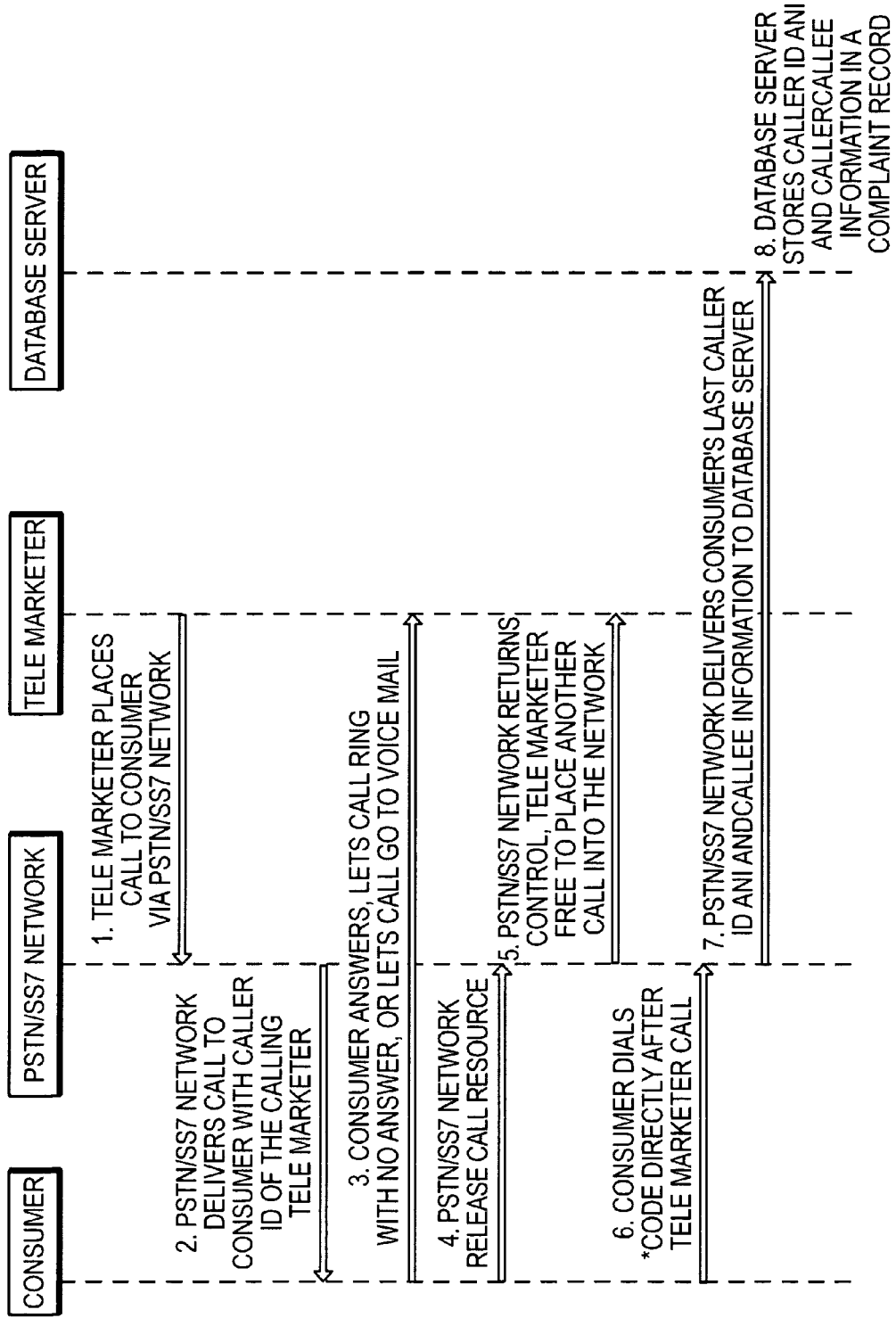
FIGS. 2A-2E illustrate example call flows for the communication systems of FIGS. 1A-1E, respectively.
Figure 2B:
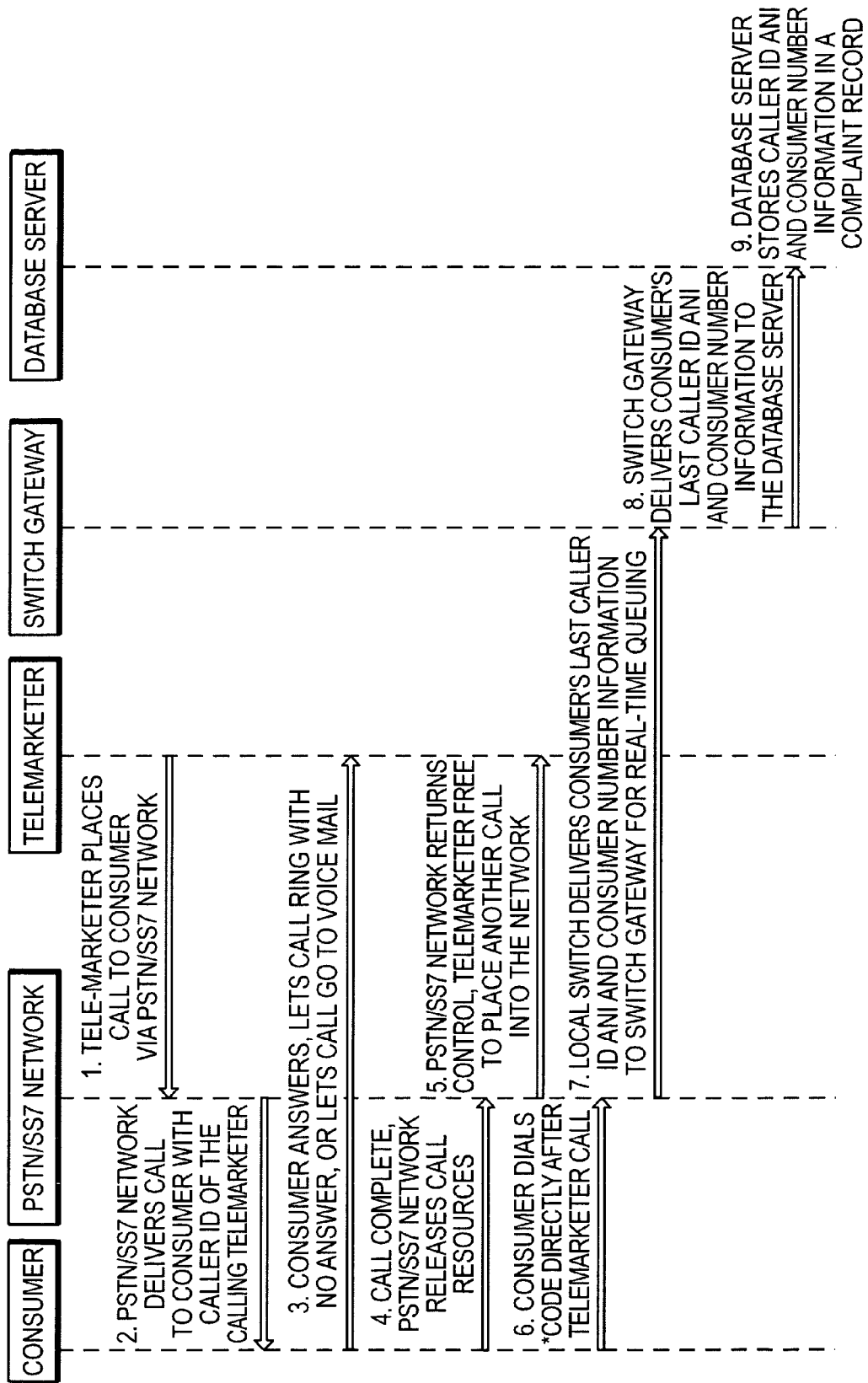
Figure 2C:
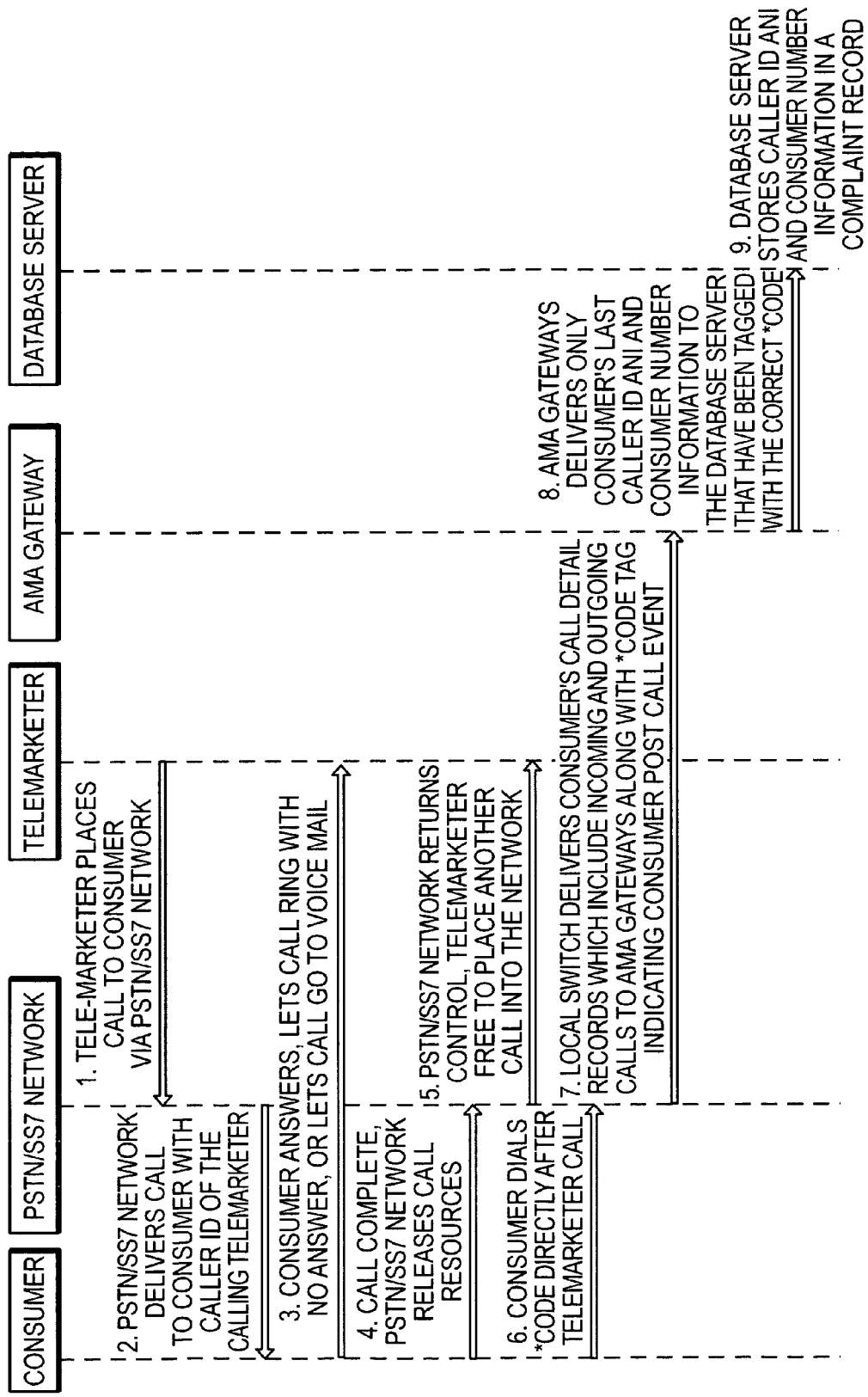
Figure 2D:
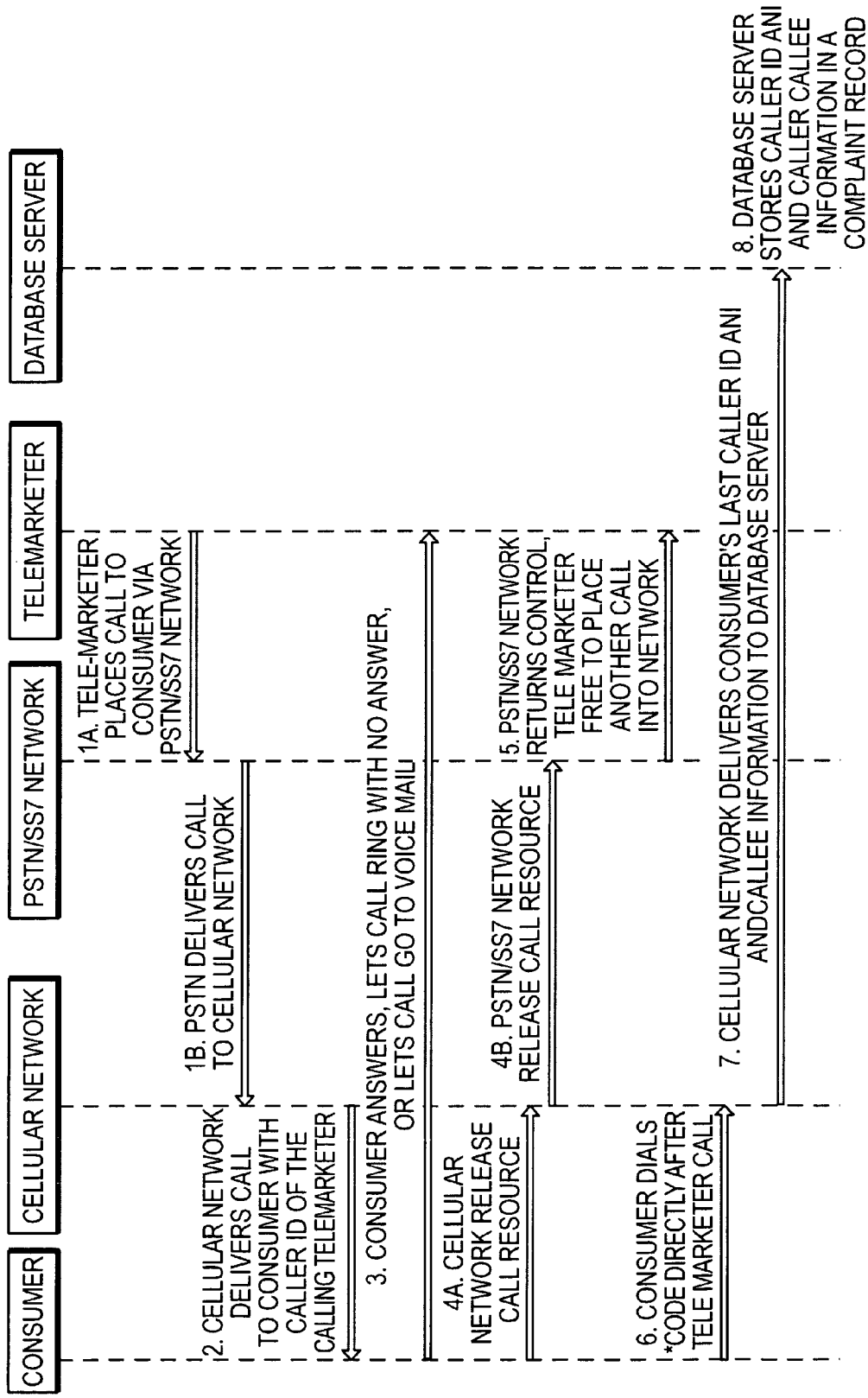
Figure 2E:
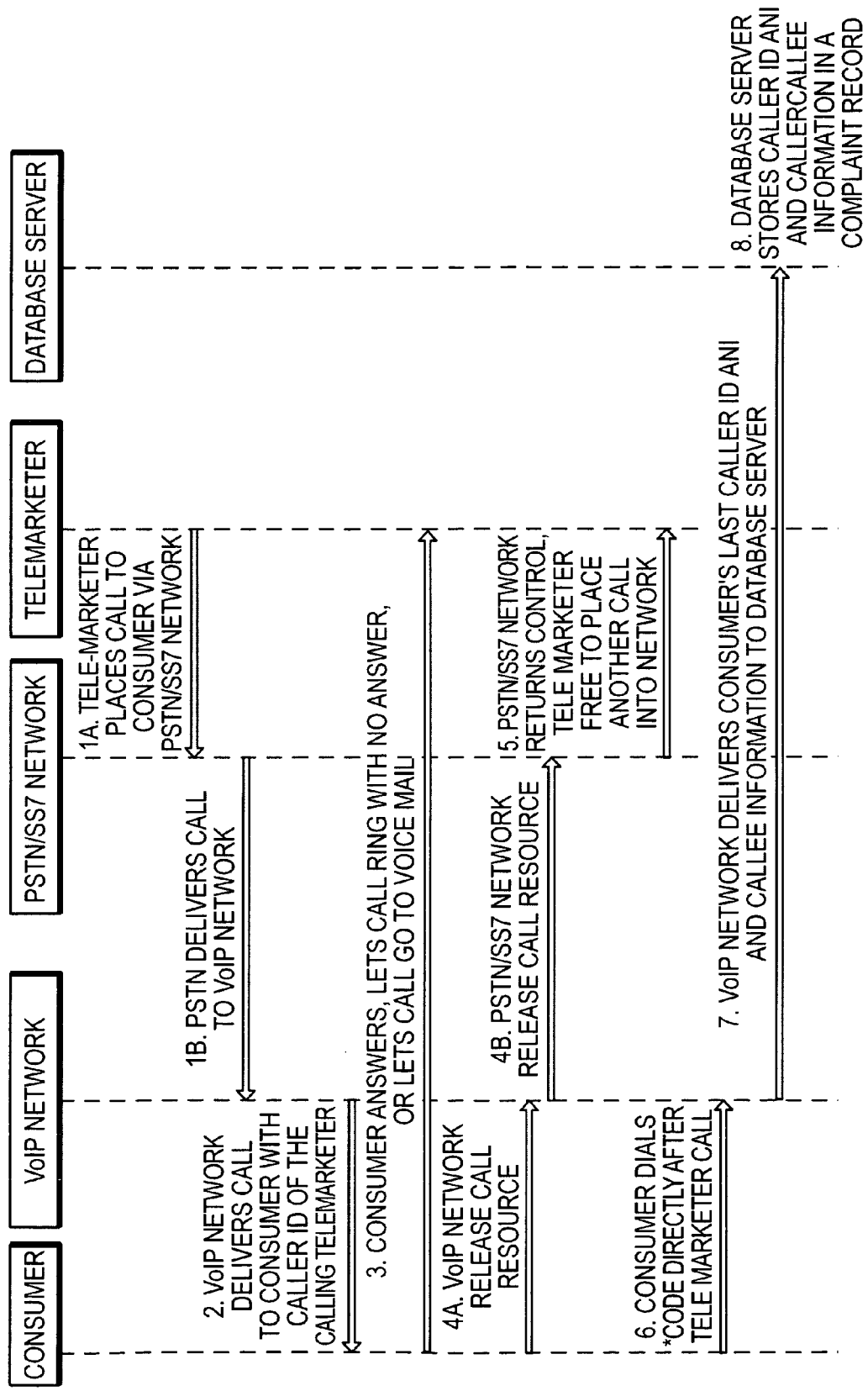

FIGS. 2A-2E illustrate example call flows relating to a method that may be implemented in the communication systems of FIGS. 1A-1E to provide for automatic registration of complaints for violations of telephonic communication regulations. In FIGS. 2A-2C, the call flow illustrates interactions among a consumer associated with called device 104 (FIGS. 1A-1C), PSTN network 110, a telemarketer associated with calling device 102 and the database server 112. FIGS. 2D-2E illustrate a call flow where the call leaves the PSTN 110, and communicates with a called device 102a or 102b in a cellular network or VoIP network, respectively. The consumer in these example call flows is also referred to as the called party and the telemarketer is referred to as the calling party.

In the first interaction, the telemarketer (calling party) places a call to the consumer (called party) over the PSTN network by dialing the called party's directory number, e.g., 617-555-XXXX. Next, the PSTN delivers the call to the consumer, with calling number delivery or caller-ID information. In FIGS. 2D and 2E, the PSTN delivers the call to either a cellular network or a VoIP network, respectively. Caller-ID typically allows the called device to receive a calling party's directory number and the date and time of the call during the first four second silent interval in the ringing cycle. In this example, the calling party directory number is 508-555-XXXX. In a third interaction, one of the following three actions may occur: the consumer may answer the call; the call may ring with no answer; or the call may be directed to an answering machine or voicemail service. Next, at the termination of the call, call resources associated with the consumer are released from the PSTN, the cellular network or the VoIP network. Additionally, the PSTN returns control such that the telemarketer is free to place another call into the network.

In the examples shown in FIGS. 2A-2E, the consumer dials a * code, e.g., *38, to effect registration of a complaint after the call is ended. In other embodiments, the consumer may elect to register a complaint concerning the calling party during the call, after reviewing a recorded message of the call or after reviewing captured Caller-ID information at the called device. The complaint may be based upon the consumer having determined that the call was received from a telemarketer to whom the consumer had previously requested do-not-call treatment. Another basis for the complaint may be that the consumer may have previously entered the consumer's directory number in a do-not-call registry such as through a do-not-call registry website run by the FTC.

In the embodiment shown in FIG. 2A, the PSTN receives the entered * code as a DTMF signal. Upon processing the DTMF signal, an advanced intelligent network trigger (AIN) of a SS7 network (shown as service control point 830 in FIG. 8) within the PSTN delivers the directory number of the last calling party (e.g., 508-555-XXXX) to the database server 112. In addition, the AIN/SS7 may deliver the directory number of the called party (e.g., 617-555-XXXX) as well as the time and date of the call. The database server receives the call information and stores the information in complaint database 114.

In an alternate embodiment shown with respect to FIG. 2B, after a consumer dials a * code, the local switch delivers the consumer's last caller ID Automatic Identification Number (ANI) (e.g., 508-555-XXXX) and consumer number information (e.g. 617-555-XXXX) to a switch gateway for real-time queuing. The switch gateway delivers the consumer's last caller ID ANI and the consumer number information to the database server 112. The database server receives the call information and stores the information in complaint database 114.

In yet another alternate embodiment shown with respect to FIG. 2C, after a consumer dials a * code, the local switch delivers the consumer's call detail records, which include incoming and outgoing calls to an Automatic Message Accounting (AMA) gateway. Included with the call detail records are last caller ID Automatic Identification Number (ANI) (e.g., 508-555-XXXX) and consumer number information (e.g. 617-555-XXXX). The incoming and outgoing calls to AMA gateways may be * code tagged. These * code tags indicate a consumer post call event. The AMA gateway delivers only the consumer's last caller ID ANI (e.g., 508-555-XXXX) and the consumer number information (e.g. 617-555-XXXX) to the database server 112 that have been tagged with the correct * code. The database server receives the call information and stores the information in complaint database 114.

In an embodiment shown with respect to FIG. 2D, after a consumer dials a * code, an advanced intelligent network trigger (AIN) of the cellular network (shown as MSC 176 in FIG. 1D) delivers the directory number of the last calling party (e.g., 508-555-XXXX) to the database server 112 through a home location registry of the cellular network. In addition, the cellular network may deliver the directory number of the called party (e.g., 617-555-XXXX) as well as the time and date of the call. The database server receives the call information and stores the information in complaint database 114.

In the embodiment shown with respect to FIG. 2E, after a consumer dials a * code, an application server of the VoIP network delivers the directory number of the last calling party (e.g., 508-555-XXXX) to the database server 112 through the PSTN. The VoIP network may also deliver the directory number of the called party (e.g., 617-555-XXXX) as well as the time and date of the call. The database server receives the call information and stores the information in complaint database 114. One of skill in the art will also recognize that the VoIP gateway may also communicate with the database server 112 through a number of different communication networks, such as the Internet.

In addition to delivering the last caller ID ANI and the consumer number information to the database server 112, the systems shown in FIGS. 1A-1E may also be configured to automatically activate selective "call rejection" consistent with typical vertical service codes (VSCs) provided by local exchange carriers. Typically, a consumer may activate a VSC for selective "call rejection" by entering a * code (e.g., a pre-selected VSC code * 60) followed by a target phone number the consumer would like to place on a call rejection list.

In the embodiment shown in FIG. 2A, the PSTN receives the entered * code as a DTMF signal. Upon processing the DTMF signal, an advanced intelligent network trigger (AIN) of a SS7 network (for example, shown as service control point in 830 in FIG. 8) within the PSTN delivers the directory number of the last calling party (e.g., 508-555-XXXX) to the database server 112. In addition, shown in FIG. 7, the AIN/SS7 and SCP gateway 835 may deliver the directory number of the called party (e.g., 617-555-XXXX) and the calling party (e.g., 508-555-XXXX) to a call rejection database 155. Future calls originating from the target phone number will be blocked from making calls to the consumer. Because the last caller ID ANI and consumer number information are already accessible to the system, in addition to forwarding that information to the complaint database, embodiments of the present invention further allow the last caller ID to be dynamically placed on the call rejection database without the consumer having to manually enter the target phone number.

While the call examples described in connection with FIGS. 1A-1E and FIGS. 2A-2E show a consumer as the called party, it should be understood that the called party can also be another business or other entity. Likewise, the calling party, depicted herein as a telemarketer for illustrative purposes, can also be some other entity such as a non-telemarketer.

An example data record 300 for storing the complaint information is shown in FIG. 3A. The record 300 includes fields for calling party directory number 302, called party directory number 304, date of call 306, time of call 308, reverse lookup information for the calling party 310, reverse lookup information for the called party 312, called party complaint notes 314, regulatory database number violated 316 and other information 318. The reverse lookup information 310, 312 may include the name and address associated with the respective directory numbers of the calling and called parties based on, for example, entries 144 found in third party databases 140 (FIGS. 1A-1C). The called party complaint notes 314 may include notes entered by the called party through a secure web portal for accessing the complaint database 114 (FIGS. 1A-1C). The regulatory database number violated 316 may indicate a particular regulatory database entry or index (e.g., entry 142 in regulatory databases 138, FIGS. 1A-1C) associated with the type of violation, e.g., federal, state or other do-not-call list. The other information field 318 may include other identifying information associated with the call, such as PSTN trunk and line equipment information.

Figure 4:
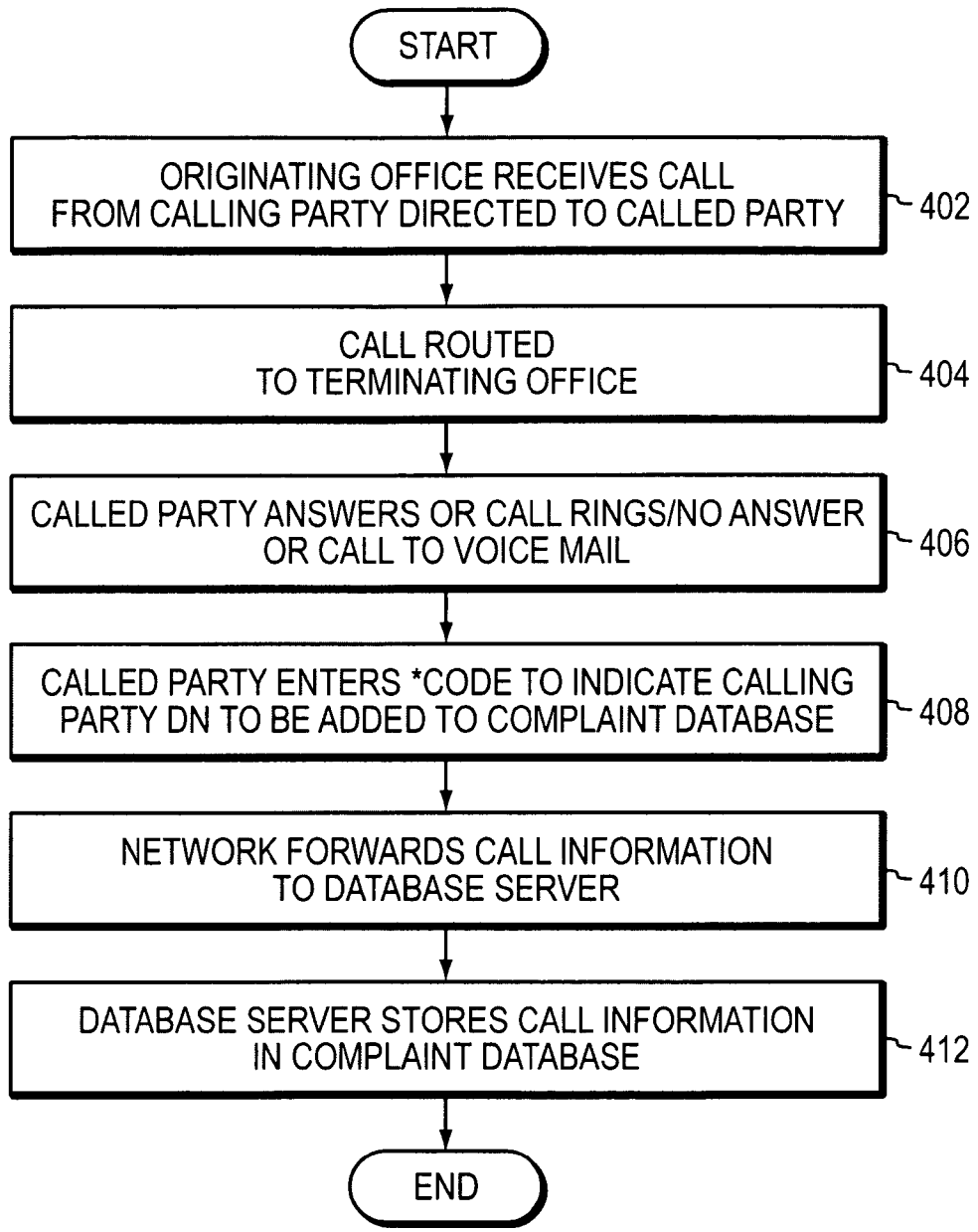
FIG. 4 illustrates a first process for the system of FIGS. 1A-1E.

Referring now to FIG. 4, a process is shown corresponding to the call flows of FIGS. 2A-2E. At 402, an originating office (e.g., switch node 106, FIG. 1A) receives a call from calling party associated with device 102 directed to called party associated with device 104. The call is routed to a terminating office (e.g., switch node 108) at 404. At 406, the called party may answer the call, not answer the call or allow the call to proceed to an answering machine or voicemail service. The called party may determine that the call is unwanted and that the calling party has violated a regulation such as do-not-call regulations. To automatically register a complaint for such violation, the called party at 408 enters a particular * code to indicate that the calling party directory number is to be added to a complaint database 114. At 410, the network 110 forwards the calling party directory number and optionally other related call information to the database server 112. As discussed with respect to FIGS. 1A-1E and 2A-2E, the calling party directs numbers and other related call information may be forwarded to database server in a number of ways. The database server stores the call information in the complaint database at 412.

Figure 5:
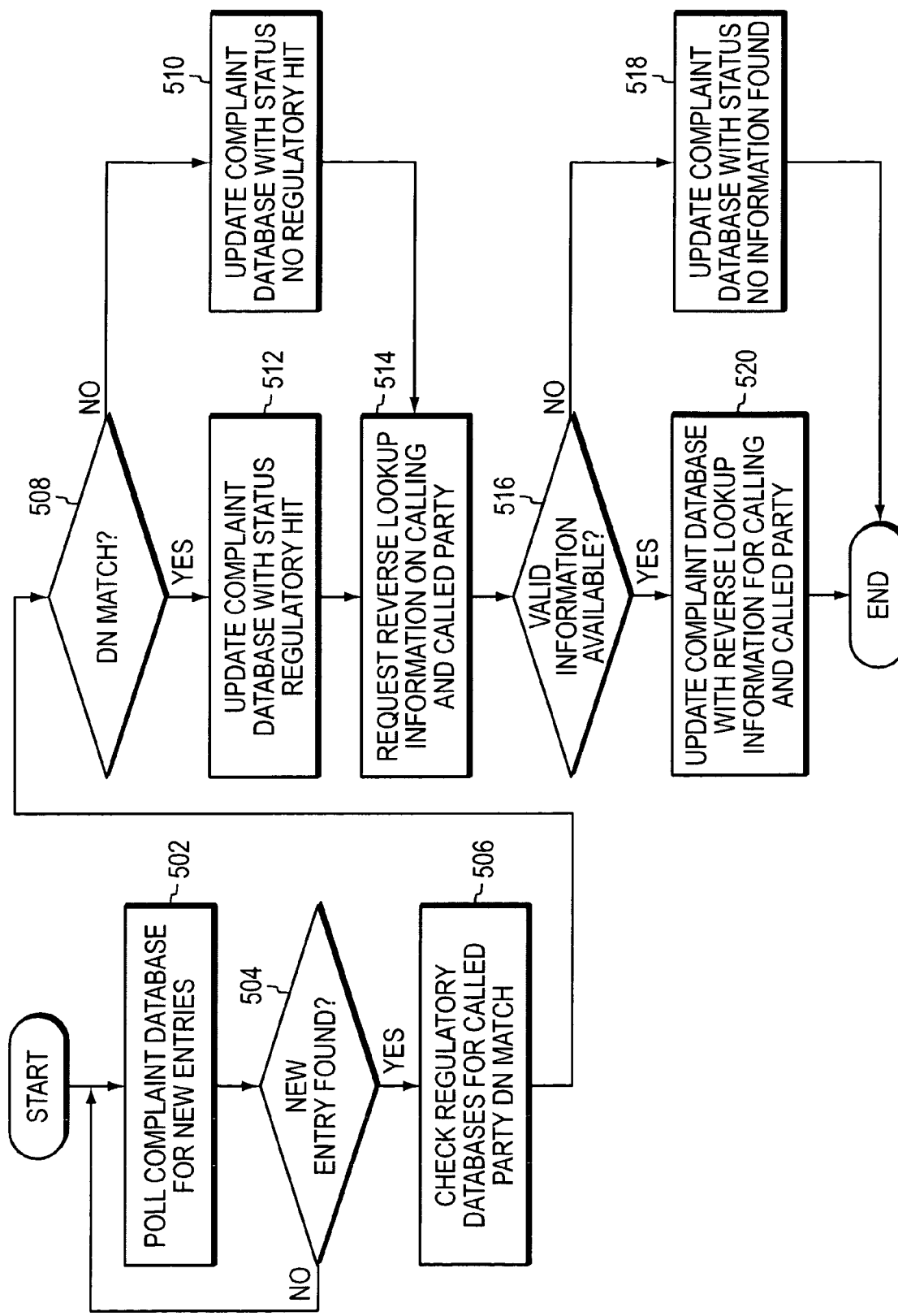
FIG. 5 illustrates a second process for the system of FIGS. 1A-1E.

FIG. 5 illustrates a process for the application server 136 (FIGS. 1A-1E) to manage updating the complaint information stored on database 114. At 502, the application server polls the complaint database 114 for new entries. If the server determines at 504 that the complaint database has a new entry, then the server checks the regulatory databases 138 (FIGS. 1A-1E) for a match based on the directory number of the called party at 506. This may include prohibited directory numbers derived from any one or a combination of a federal do-not-call list, a state do-not-call list, an industry-specific do-not-call list, a client internal list specific to the calling party and other defined lists. If the server determines at 508 that there is not a hit in the regulatory databases, the server updates the complaint record entry at 510 with a status indicating that no regulatory hit was found. If there is a hit in the regulatory databases, the server updates the complaint record entry at 512 with a status indicating that a regulatory hit was found. The status may include an indication of the type of violation, e.g., entry on a federal do-not-call list.

At 514, the process continues with the application server requesting reverse lookup information from one or more third party databases 140 based on the respective directory numbers of the calling and called party. If the server determines at 516 that valid reverse lookup information is not available, the server updates the complaint record entry at 518 with a status indicating that no information was found. If there is valid information available, the server updates the complaint record entry at 520 with the reverse lookup information retrieved from the third party databases 140.

Figure 6A:
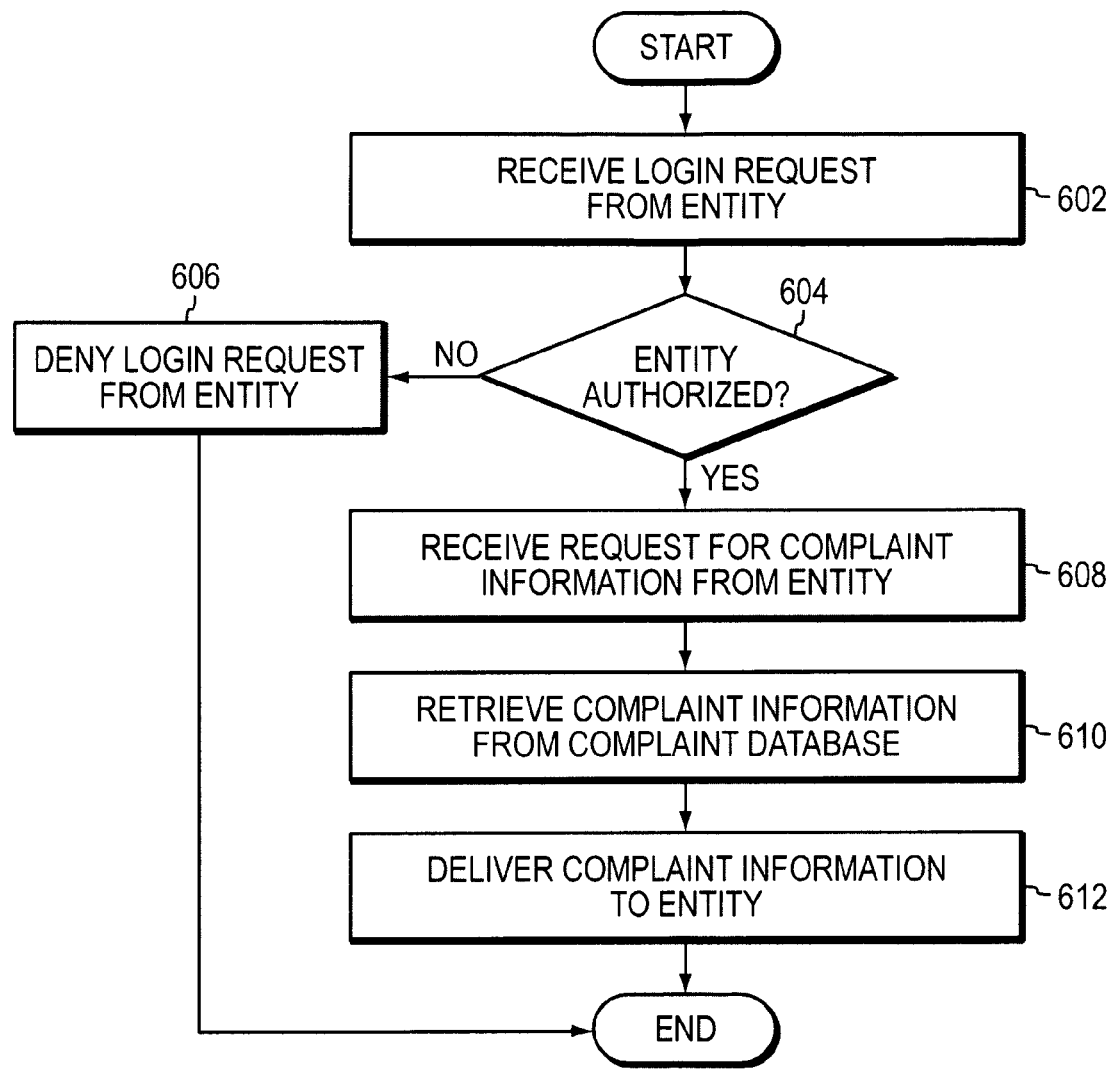
FIG. 6A illustrates a third process for the system of FIGS. 1A-1E.

FIG. 6A illustrates a process for the application server 136 (FIGS. 1A-1E) to manage access to complaint information stored on database 114. At 602, the application server receives a login request from an entity such as a telemarketing company, consumer, consumer advocacy group or a regulatory body through PCs 116A, 116B, 116C (FIGS. 1A-1E). As noted above, the application server may include a web service that provides web access, e.g., a secure web portal as known in the art. If the entity is not authorized to access the database at 604, then the application server denies the request at 606. Otherwise, the process continues at 608 with receipt of a request for complaint information from the entity. The request for complaint information may be in the form of a database query using conventional database software. The entity may be restricted to particular portions of the stored complaint data records based on various levels of user access. For example, the data may be restricted based on the name of the business entity associated with each individual complaint. If the query is authorized, then at 610 the application server retrieves the requested information and delivers the information to the entity at 612.

Figure 6B:
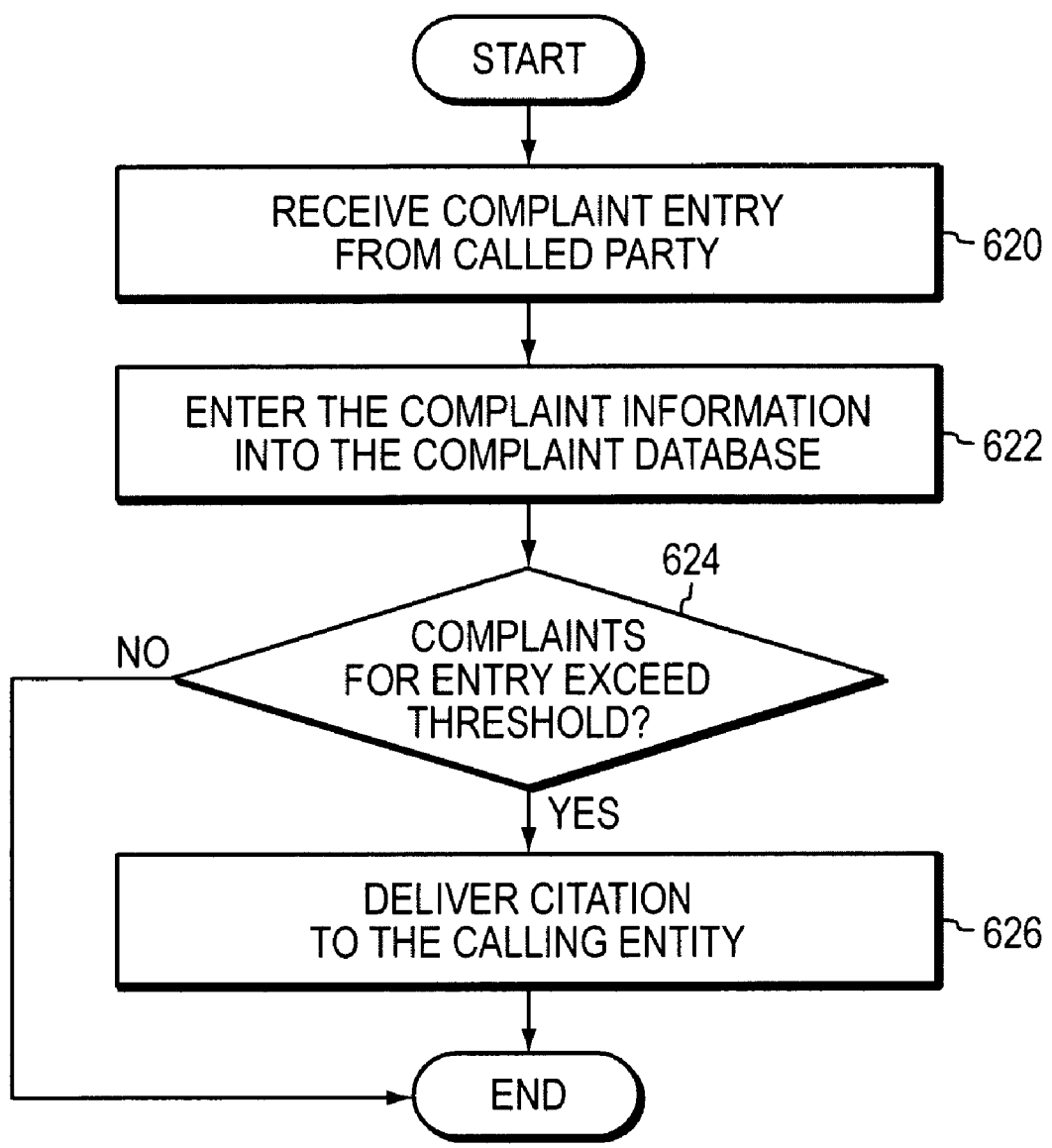
FIG. 6B illustrates a fourth process for the system of FIGS. 1A-1E.

The process illustrated in FIG. 6A relates to delivery of complaint information based on requests made by entities. In other embodiments, complaint information or citations based on the complaint information may be forwarded to an entity on a periodic basis (e.g., instantly, daily or monthly) or based on the occurrence of a type of violation event, set threshold or metering of multiple violations, without requiring a request for the information. For example, FIG. 6B illustrates a process for the database server 112 or application server 136 (FIGS. 1A-1E) to manage delivery of complaint information stored on complaint database 114. At 620, the application server receives a complaint information entry from the called party. The complaint information is entered into the complaint database 114 at 622. If the number of complaints based on the current entry for a particular calling party exceeds a threshold at 624, a citation is delivered to the calling party at 626.

Figure 7:
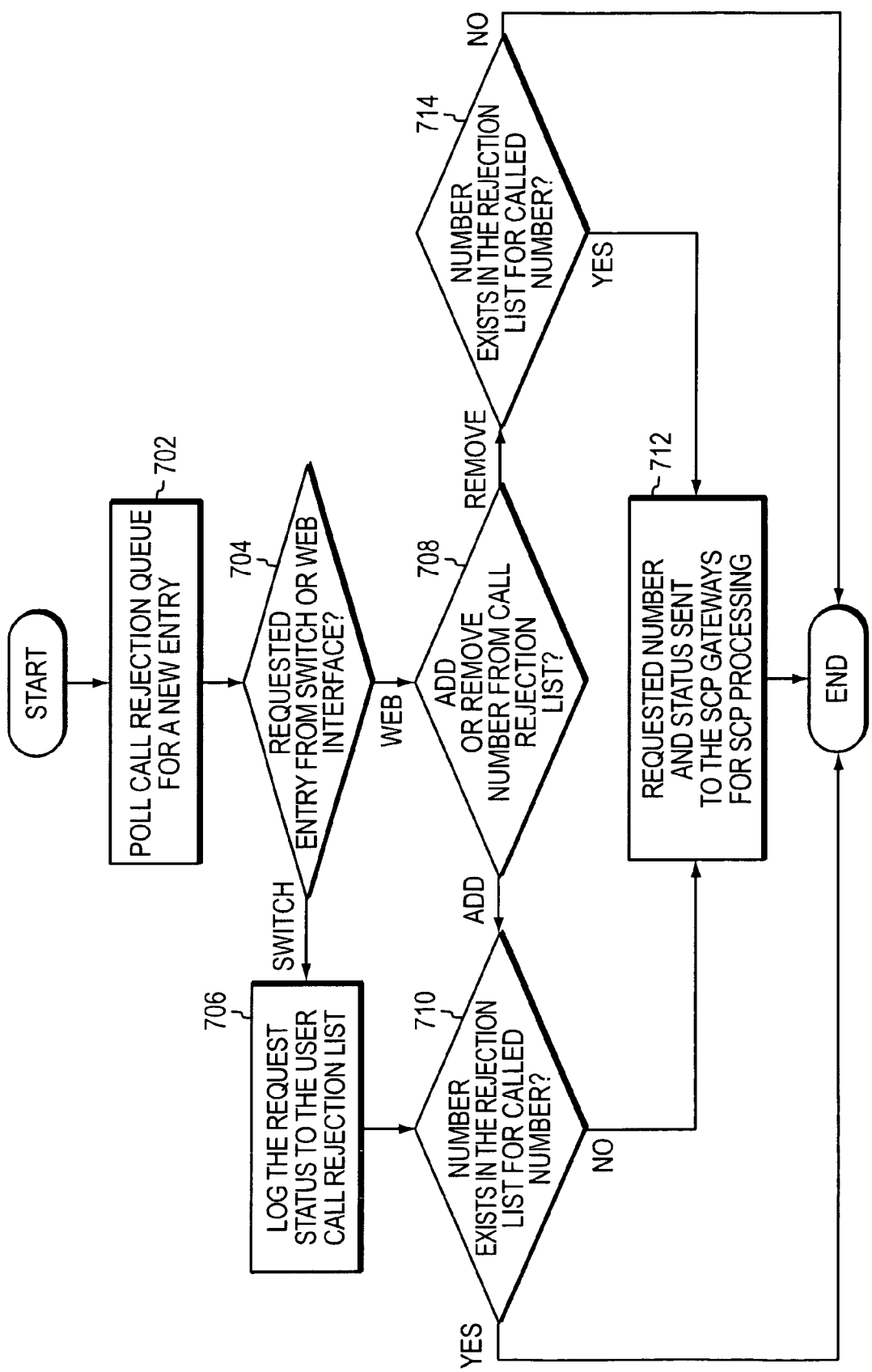
FIG. 7 illustrates a fifth process for the system of FIGS. 1A-1E.

In other embodiments, individuals (e.g. subscribers) may control and manage their own call blocking list to provide individualized communications controls applied by their carrier at a control point, such as a switch control point or at a mobile switching center. Rather than simply relying on the calling party to place their number on a do-not-call list, individuals can maintain their own call rejection list or blocking list as shown in FIG. 7, utilizing a call rejection database 155 accessed through the switch control point 830. In addition, by blocking calls at a switch control point, carriers can avoid devoting call set-up resources at an earlier point in the process.

FIG. 3B is an example data record 350 for storing call rejection information that may be used in connection with such controls. The record 350 may be stored in a database or server accessible to the SCP or MSC. The record includes fields for called party directory number 352, calling party directory number 354, date of call request 356, time of request 358, whether the calling party directory number is on the blocked list 360, the source identification 362 (e.g., whether the record came from a switch or from a web interface) and other information 364. The other information field 364 may include other identifying information associated with the call, such as PSTN trunk and line equipment information. When a calling device attempts to place a call, an SCP or MSC can either block the call or allow it depending on information contained in a look up table or blocking list corresponding to the called number and the calling number.

FIG. 7 illustrates a process of maintaining and changing the status of a directory identifier (or identifier entry) on a user call rejection list. The system may poll a rejection queue for a new entry 702. The new entry may be from either a switch or from a web interface 704. If the entry is from a switch, the requested entry is automatically logged to the user's call rejection list 706. The system then determines whether the directory identifier is already on the user's call rejection list 710. If it is, the process is complete. If it is not, the directory identifier and the status is sent to the SCP gateways for SCP processing, allowing the SCPs to update any blocking lists in their corresponding databases. With a web interface, users can either add or remove numbers from their call rejection list 708. If they seek to add a number to the list, the process is similar to an entry from a switch interface. The system determines whether the directory identifier is already on the user's call rejection list 710, and sends the directory identifier and the status to the SCP gateways for SCP processing accordingly. If the user seeks to make sure a number is not on their call rejection list, to allow future contact, the system determines whether the directory identifier is on the user's call rejection list 714, and if it is, the directory identifier and the status is sent to the SCP gateways for SCP processing, allowing the SCPs to remove the directory identifier from any blocking lists in their corresponding databases. If the directory identifier is not on the list, no further action is necessary.

It will be apparent to those of ordinary skill in the art that methods involved in the present invention may be embodied in a computer program product that includes a computer usable medium. For example, such a computer usable medium may consist of a read only memory device, such as a CD ROM disk or conventional ROM devices, or a random access memory, such as a hard drive device or a computer diskette, having a computer readable program code stored thereon.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for a server in communication with the public switched telephone network (PSTN) to lodge a call complaint in a database of complaints comprising the steps of:
   receiving a transmitted SS7 message prepared by a terminating switch, consequential to a DTMF or alphanumeric sequence transmitted from a called party, indicating that the called party, having received a call from a calling party number, desires to record a call complaint against the calling party number; and
   directing a complaint database in communication with said server to add a call complaint relative to said calling party number;
   wherein said SS7 message includes the calling party number.

2. The method of claim 1 wherein the SS7 message includes, the called party number, and time and date of the call.

3. The method of claim 1 wherein the SS7 message is transmitted through a cellular communications network.

4. The method of claim 1 wherein the SS7 message is transmitted through a voice over internet protocol (VoIP) network.

5. The method of claim 1 wherein the SS7 message is transmitted through a private network.

6. The method of claim 1 wherein the SS7 message is transmitted through a switch gateway.

7. The method of claim 1 wherein the SS7 message is transmitted through an Automatic Message Accounting (AMA) gateway.

8. The method of claim 1 further comprising sending a message to the calling party number when the received complaint exceeding a complaint threshold.

9. The method of claim 1 further comprising the step of preparing a second SS7 message and forwarding said message to a call rejection database configured to indicate blocking of further calls from the calling party to the called party.

10. A method for a server in communication with the PSTN to change an identifier entry in a call rejection database, where said database includes a user call rejection list, comprising the steps of:
   receiving a SS7 message for a request for a change in status of an identifier entry on a user call rejection list in a call rejection database, said SS7 message prepared by a terminating switch in response to a DTMF or alphanumeric sequence, transmitted from a called party;
   directing a call rejection database to change the status of the identifier entry on the user call rejection list associated with the transmitter of said sequence based on a comparison of the current status of the identifier entry with the request; and
   preparing and returning a return message addressed to said terminating switch directing call rejection treatment based on the identifier entry and status;
   wherein said SS7 and return messages include the called party number and the calling party number.

11. The method of claim 10 wherein the identifier entry is a phone number.

12. The method of claim 10 wherein changing the status includes adding or removing the identifier entry on the list.

13. The method of claim 10 wherein said request is delivered using a web interface.

14. The method of claim 10 wherein changing the status includes flagging a field in a call record.

15. The method of claim 10 further comprising the step of preparing a second SS7 message and forwarding said message to a call rejection database configured to indicate blocking of further calls from the calling party to the called party.

16. A server apparatus for adding a complaint to a database of complaints comprising:
   receiving means for receiving signaling data delivered using the PSTN, said signaling data indicating that a called party, responsive to receiving a call from a calling party, desires to record a complaint against the calling party;
   insertion means to add a complaint for adding a call complaint to a complaint database; and
   forwarding means for forwarding call rejection information to a call rejection database configured to indicate blocking of further calls from the calling party to the called party.

17. Apparatus comprising:
   a complaint database;
   a call rejection database; and
   a database server configured to receive call information to record a complaint from a called party against a calling party relating to receipt of a call, to add a call complaint based on the call information to the complaint database and to forward call rejection information based on the call information to the call rejection database to indicate blocking of further calls from the calling party to the called party.

18. The apparatus of claim 17 wherein the call information includes the calling party directory number, the called party directory number, time and date of the call.

19. The apparatus of claim 17 wherein the call information is received through a SS7/AIN network, a cellular communications network, a voice over internet protocol (VoIP) network, a private network, a switch gateway, an Automatic Message Accounting (AMA) gateway, or any combination thereof.

20. The apparatus of claim 17 wherein the database server is further configured to send a citation to the calling party based on the received complaint exceeding a complaint threshold.

21. Apparatus comprising:
   receiving means using the PSTN for receiving a request for a change in status of an identifier entry on a user call rejection list;
   means for changing the status of the identifier entry on the user call rejection list based on a comparison of the current status of the identifier entry with the request; and
   sending means for sending the identifier entry and corresponding status to a service control point gateway for call rejection treatment based on the identifier entry and status.

* * * * *